United States Patent
Morovic et al.

(10) Patent No.: US 11,222,153 B2
(45) Date of Patent: Jan. 11, 2022

(54) THREE-DIMENSIONAL OBJECT GENERATION PARAMETER DESCRIPTIONS

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB); Paul J. Benning, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 869 days.

(21) Appl. No.: 15/747,026

(22) PCT Filed: Oct. 30, 2015

(86) PCT No.: PCT/US2015/058232
§ 371 (c)(1),
(2) Date: Jan. 23, 2018

(87) PCT Pub. No.: WO2017/074413
PCT Pub. Date: May 4, 2017

(65) Prior Publication Data
US 2019/0012415 A1    Jan. 10, 2019

(51) Int. Cl.
*G06F 30/23*      (2020.01)
*B29C 64/386*   (2017.01)
(Continued)

(52) U.S. Cl.
CPC ............ *G06F 30/23* (2020.01); *B29C 64/386* (2017.08); *B29C 64/393* (2017.08); *G06T 17/10* (2013.01);
(Continued)

(58) Field of Classification Search
CPC ... G06F 30/23; G06F 2119/18; B29C 64/386; B29C 64/393; G06T 17/10; H04N 1/40; H04N 1/405; B33Y 50/02
See application file for complete search history.

(56) References Cited

U.S. PATENT DOCUMENTS

| | | |
|---|---|---|
| 7,203,628 B1 | 4/2007 | St. Ville |
| 2005/0060130 A1 | 3/2005 | Shapiro et al. |

(Continued)

FOREIGN PATENT DOCUMENTS

| | | |
|---|---|---|
| CN | 102279898 | 12/2011 |
| CN | 103978690 | 8/2014 |

(Continued)

OTHER PUBLICATIONS

Rao, P. K., Liu, J., Roberson, D., & Kong, Z. (Jun. 2015). Sensor-based online process fault detection in additive manufacturing. In International Manufacturing Science and Engineering Conference (vol. 56833, p. V002T04A010). American Society of Mechanical Engineers. (Year: 2015).*

(Continued)

*Primary Examiner* — Bijan Mapar
(74) *Attorney, Agent, or Firm* — HP Inc. Patent Department

(57) ABSTRACT

In some examples, data representing a three-dimensional object is received. The data may comprise an object property description associated with each of a plurality of locations within the object. At least one object generation parameter description associated with a region of the object may be determined from the data. The object generation parameter description may comprise at least one object generation apparatus control parameter value and a probability that (Continued)

control data generated therefrom will specify said object generation apparatus control parameter value for generating the region of the object.

20 Claims, 3 Drawing Sheets

(51) Int. Cl.

| | | |
|---|---|---|
| *B29C 64/393* | (2017.01) | |
| *G06T 17/10* | (2006.01) | |
| *B33Y 50/02* | (2015.01) | |
| *G06F 119/18* | (2020.01) | |
| *H04N 1/40* | (2006.01) | |
| *H04N 1/405* | (2006.01) | |

(52) U.S. Cl.
CPC ............... *H04N 1/40* (2013.01); *B33Y 50/02* (2014.12); *G06F 2119/18* (2020.01); *H04N 1/405* (2013.01)

(56) References Cited

U.S. PATENT DOCUMENTS

| | | |
|---|---|---|
| 2006/0239588 A1 | 10/2006 | Hull et al. |
| 2014/0025190 A1 | 1/2014 | Wu et al. |
| 2014/0154378 A1 | 6/2014 | von Hasseln et al. |
| 2014/0306380 A1 | 10/2014 | El-Siblani et al. |
| 2014/0324204 A1 | 10/2014 | Vidimce |
| 2015/0130117 A1 | 5/2015 | Lacaze et al. |
| 2017/0028650 A1* | 2/2017 | Utsunomiya ......... B29C 64/165 |

FOREIGN PATENT DOCUMENTS

| | | |
|---|---|---|
| CN | 107209958 | 9/2017 |
| EP | 1894704 | 3/2008 |
| JP | 2004514053 | 5/2004 |
| JP | 2006513055 | 4/2006 |
| WO | WO-2015014381 | 2/2015 |
| WO | WO-2015106816 A1 | 7/2015 |
| WO | WO-2015106844 A1 | 7/2015 |
| WO | WO-2016169620 | 10/2016 |
| WO | WO-2016171717 | 10/2016 |
| WO | WO-2016171719 A1 | 10/2016 |

OTHER PUBLICATIONS

Verma, A., & Rai, R. (Aug. 2013). Energy efficient modeling and optimization of additive manufacturing processes. In solid freeform fabrication symposium, Austin, TX (pp. 231-241). (Year: 2013).*

Doubrovski, E.L. et al., Voxel-based fabrication through material property mapping: A design method for bitmap printing, Dec. 2, 2014 (11 pages).

Korean Intellectual Property Office, International Search Report and Written Opinion for PCT/US2015/058232 dated Jul. 29, 2016 (8 pages).

* cited by examiner

| | Agent 1 | Agent 2 | Agent 3 | Fusing power |
|---|---|---|---|---|
| 1 | 0 | 0 | 0 | 500w |
| 2 | 0 | 0 | 1 | 500w |
| 3 | 0 | 1 | 0 | 500w |
| 4 | 0 | 1 | 1 | 500w |
| 5 | 1 | 0 | 0 | 500w |
| 6 | 1 | 0 | 1 | 500w |
| 7 | 1 | 1 | 0 | 500w |
| 8 | 1 | 1 | 1 | 500w |
| 9 | 0 | 0 | 0 | 600w |
| 10 | 0 | 0 | 1 | 600w |
| 11 | 0 | 1 | 0 | 600w |
| 12 | 0 | 1 | 1 | 600w |
| 13 | 1 | 0 | 0 | 600w |
| 14 | 1 | 0 | 1 | 600w |
| 15 | 1 | 1 | 0 | 600w |
| 16 | 1 | 1 | 1 | 600w |
| 17 | 0 | 0 | 0 | 700w |
| 18 | 0 | 0 | 1 | 700w |
| 19 | 0 | 1 | 0 | 700w |
| 20 | 0 | 1 | 1 | 700w |
| 21 | 1 | 0 | 0 | 700w |
| 22 | 1 | 0 | 1 | 700w |
| 23 | 1 | 1 | 0 | 700w |
| 24 | 1 | 1 | 1 | 700w |

THREE-DIMENSIONAL OBJECT GENERATION PARAMETER DESCRIPTIONS

BACKGROUND

Three-dimensional objects generated by an additive manufacturing process may be formed in a layer-by-layer manner. In examples of additive manufacturing, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some processes that generate three-dimensional objects use control data generated from a model of a three-dimensional object. This control data may, for example, specify the locations at which to apply an agent to the build material, or where a build material itself may be placed, and the amounts to be placed. The control data may be generated from a 3D representation of an object to be printed.

BRIEF DESCRIPTION OF DRAWINGS

For a more complete understanding, reference is now made to the following description taken in conjunction with the accompanying drawings in which.

DETAILED DESCRIPTION

Figures 1, 2:
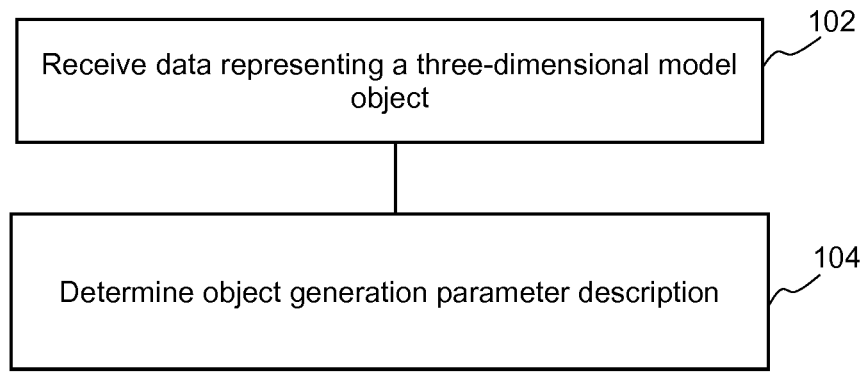
FIG. 1 is a flowchart of an example of a method for determining object generation parameter descriptions.
FIG. 2 shows examples of object generation parameter value sets.

Some examples described herein provide an apparatus and a method for representing a three dimensional object and/or for generating control data that may be used to produce a three dimensional object. Some examples allow data describing three dimensional objects with a variety of specified object properties to be processed and used to generate a three-dimensional object. These object properties may comprise appearance properties (color, transparency, glossiness, etc.), conductivity, density, porosity and/or mechanical properties such as strength.

In some examples herein, three-dimensional space is characterised in terms of 'voxels', i.e. three-dimensional pixels, wherein each voxel occupies or represents a discrete volume. In data modelling a three dimensional object, a voxel at a given location may have at least one characteristic. For example, it may be empty, or may have a particular color or may represent a particular material, or a particular object property, or the like. The voxels of an object may have the same shape (for example, cubic or tetrahedral), or may differ in shape and/or size.

In some examples, a print material coverage representation defines print material data, for example detailing the amount of print materials (such as agent(s) to be deposited onto a layer of build material, or in some examples, build materials themselves), and, if applicable, their combinations. Such print materials may be related to or selected to provide an object property such as, for example, color, transparency, flexibility, elasticity, rigidity, surface roughness, porosity, conductivity, inter-layer strength, density, and the like.

For example, a set of voxels within object model data may have an associated print material coverage representation comprising a set of print material volume coverage (Mvoc) vectors. Such vector provides probability that a print material may be applied in a location. In a simple case, such a vector may indicate that X % of a given region of three-dimensional space should have a particular agent applied thereto, whereas (100−X) % should be left clear of agent. In practise, this will be resolved at the addressable resolution for the print material. Therefore, if there are N×M addressable locations in an XY plane, X % of these locations may receive a print material, while (100−X) % do not.

An Mvoc vector may have a plurality of values, wherein each value defines a probability for each, or each combination of print materials in an addressable location of a layer of the three-dimensional object. For example, in an additive manufacturing system with two available print materials (for example, agents)—M1 and M2, where each print material may be independently deposited in an addressable volume of the three-dimensional object, there may be $2^2$ (i.e. four) probabilities in a given Mvoc vector: a first probability for M1 without M2; a second probability for M2 without M1; a third probability for an over-deposit (i.e. a combination) of M1 and M2, e.g. M2 deposited over M1 or vice versa; and a fourth probability for an absence of both M1 and M2. In this example, it is assumed that a drop of agent may be applied or not: this a binary choice and the value for each agent may be either 0 or 1. In this case an Mvoc vector may be: [M1, M2, M1M2, Z] or with example probabilities [M1:0.2, M2:0.2, M1M2: 0.5, Z:0.1]—for given [x, y, z] location (which in some examples may be a [x, y] location in a z slice), 20% of locations will receive M1 without M2, 20% will receive M2 without M1, 50% will receive M1 and M2 and 10% will be left clear. As each value is a proportion and the set of values represent the available material combinations, the set of values in each vector sum to 1 or 100%.

Such an Mvoc vector therefore specifies a plurality of print materials, and a probability that each of these print materials is associated with a value.

The actual distribution may for example be achieved using a 'halftoning' process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

FIG. 1 is an example of a method for determining object generation parameter descriptions. In block 102, data representing an object and comprising an object property description associated with each of a plurality of locations within the object is received. The data may for example be the output of a Computer Aided Design (CAD) program, or some other digital representation of a three dimensional object.

In some examples, the locations may comprise point locations, for example [x,y,z] coordinates defining a point in space. In other examples, the locations may comprise regions, for example object property description voxels, as described above. In other examples, other volumetric descriptions may be used to define a location. In some examples, the locations may be defined in a geometric model of the object.

The object property descriptions may describe any property attributed to the object represented by the data, such as appearance properties (color, transparency, glossiness, etc.), conductivity, density, porosity and/or mechanical properties such as strength. In some examples, the object property description may comprise at least one print material, for example a granular build material or a print agent to be applied to the build material, and/or associated object generation apparatus control parameters.

In block 104, at least one object generation parameter description is determined from the data. An object generation parameter description comprises at least one object generation apparatus control parameter value and a probability that control data generated therefrom will specify said object generation apparatus control parameter value for generating a region of the object with which it is associated. In some examples, determining an object generation parameter description may comprise applying a mapping, for example using a look up table or the like.

As has been discussed above, print materials for use in generating control data may be described by assigning probabilities (or proportional volume coverages) for use in generating control data. In the present example, object generation apparatus control parameter(s) may also be specified in a probabilistic manner and control data may be generated on this basis.

Object generation apparatus control parameters may comprise any controllable parameter of the apparatus. This may be contrasted with controlling a level or amount of a print material used within the apparatus. For example, it may comprise at least one object generation fusing apparatus control parameter. In such examples, an object generation parameter description may for example set out a probability that control data for a fusing apparatus such as a heat lamp or other energy source will specify at least one of a set or continuum of power level values, temperature level values, emission spectrums, or the like.

Taking as an example a fusing temperature, in an example, it may be that temperature is intended to take one of two values in object generation (for example dictated by intended object properties in a region: a higher temperature may for example increase strength at additional energy cost, and therefore be used in regions of the objects which are intended to be particular strong, and not in other regions). These values may be designated T1 and T2. For a particular region, it may be the case that T1 should be selected in 75% of cases, but a selection of T2 in 25% of cases will still result in an object having acceptable properties. In such an example, an object generation parameter description may be expressed as:

[T1:0.75, T2:0.25]

More generally, this could be expressed as

[$p_1$(T1), $p_2$(T2)], where $p_1$ and $p_2$ are the respective probabilities. In this example, the object generation parameter description relates to a single parameter, providing a probability associated with each of two values for that parameter.

In some examples, object generation parameter descriptions and/or the object property descriptions may be a common description which applies to a voxel (or, conversely, the voxel may be defined as a region of the object to which a common object property description/object generation parameter description applies). In other examples (or at other stages in related processes, as described below), a voxel may be defined at the print resolution of an object generation apparatus.

Examples of object generation parameter values are shown in FIG. 2. In this example, the object generation parameter description describes four parameters: three print material parameters and one object generation control parameter. More particularly, in this example, 24 value sets are defined, each value set comprising a value (in this example a binary value) for each three different agents which can be applied in any combination, and a fusing power value. In this example, there are three possible values for the fusing power: 500 watts, 600 watts and 700 watts.

The object property generation parameter description associated with this value set may be expressed as:

[$p_1$(set 1), $p_2$(set 2), $p_3$(set 3), ... $p_{23}$(set 23), $p_{24}$(set 24)]

Where $p_n$ represents the probability that control data will specify value set n and $\Sigma_{n=1}^{24} p_n = 1$.

In some examples, object property descriptions can be mapped to object generation parameter descriptions, for example being associated via a look-up table. Different object properties may result in a different distribution of probabilities across the defined value sets. In some examples, the value of p for at least one of the value sets may be zero. If exactly one value set has a non-zero value (i.e. p=1 for one value set), then the control data for that location may be derived from that value set (although in some examples, for example where object generation parameter descriptions and/or values derived therefrom are combined as is described in greater detail below, the control data may be derived from, or in combination with a different value or value set).

In some examples, the values or value sets may describe all of the states for the parameters described thereby. In other examples, intermediate values may be interpolated. For some object generation parameters, for example those which can be smoothly or substantially continuously varied, the interpolation of values is relatively straight forward. For example, a new value set having a fusing power of 625 watts may be added to an object generation parameter description in order to provide access to such a level of control. This may provide greater control variability.

In some examples, mappings from object property data to control data may be predetermined using the principles set out herein. In such an example, if there is a mapping from a first object property to a first set of control data, and a mapping from a second object property to a second set of control data to be used in object generation, then if an object property is seen in object data which is intermediate to the first and second object properties, this may be assigned a control data set in which at least one of the parameter values is intermediate to the values for that parameter in the first and second control data sets.

Some object generation parameters may take one of a set of values, which in some examples, is a predetermined set of values. For example, in an example of an object generation apparatus, it may be possible to either apply a drop of agent or not, i.e. the agent value may have a value of either 0 or 1, but not any other value. In respect of such parameters, in some examples, all the value combinations (or all compatible combinations—for example, some print materials may dictate fusing control parameter values, or some print agents may be incompatible with particular build materials or each other) may be mentioned within the value sets. For completeness, it should be noted that in some examples, it may be possible to vary print agent drop size and thus provide a continuum in agent coverage, but the contrary example is considered here.

In some examples, other object generation parameters may be included in the value sets of an object generation parameter description. For example, a value set could include a value for at least one build material, an agent concentration, drop numbers or drop size, fusing energy source (e.g. to allow to select between using a heat lamp, microwaves, electron beam, etc.) or the like. In relation to drop number, in some examples, it may be possible to place some print material or none (i.e. the placement of print agents is binary). In other examples, different number of drops may be applied. In some examples, if the drop size is variable, this may be managed by defining application of agents with different drop sizes as if they were different agents (as their spatial effect may differ). In some examples, each object generation parameter description comprises a value set comprising a set of values for n parameters where n≥1 (in the example of FIG. 2, n=4). The size of the object generation parameter description depends on the number of parameters, the number of values for each parameter and the number of combinations of values (bearing in mind that in some examples, parameters may be coupled: for example, build material A may dictate a fusing power X, and build material B may dictate a fusing power of Y, or some values may be incompatible), and the like. Different parameters, or different combination of parameters, may be described in separate object generation parameter descriptions. A location may map to a plurality of object generation parameter descriptions, which may relate to different parameters.

Figure 3:
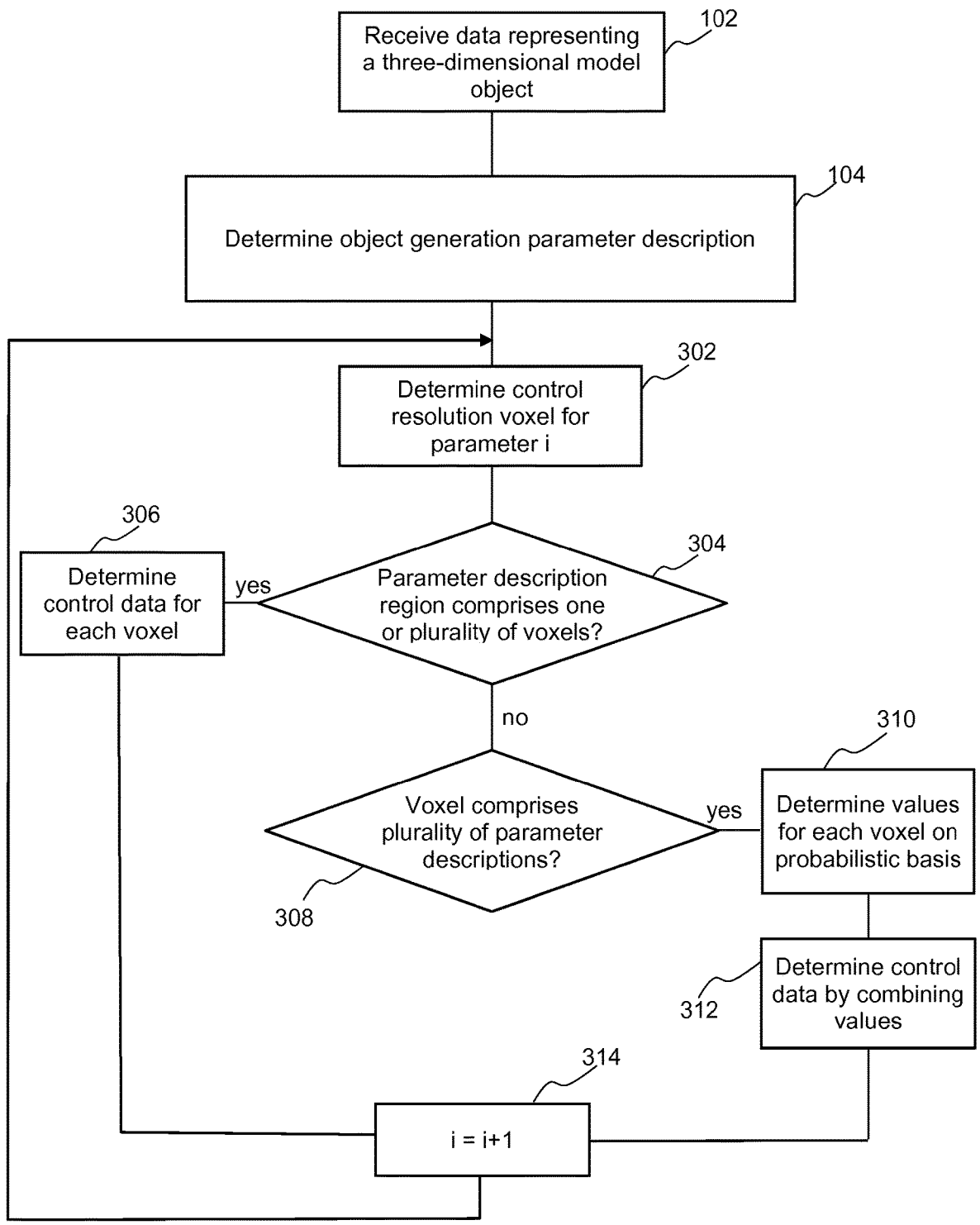
FIG. 3 is a flowchart of an example of a method of determining control data.

FIG. 3 is an example of a method which comprises, in addition to the blocks described in relation to FIG. 1, generating control data. The control data may be for use by an object generation apparatus to generate a three dimensional object having properties substantially (or the extent achievable by the apparatus) as set out in the object property descriptions, and may specify at least one object generation apparatus control parameter value and at least one print material to be used when generating a portion of the object corresponding to at least one location. Control data may be determined by selecting a particular value or value set from an object generation parameter description on a probabilistic basis.

In the example of FIG. 3, at least one control resolution voxel for a parameter is determined (block 302). At least one, and in some examples, all the parameters having values in the object generation parameter description, may be associated with a control resolution voxel, i.e. the size and, in some examples, location, of volume which can be individually addressed when controlling an object generation apparatus. The size of the volume may be different for different parameters.

For example, a print agent may be applied with a control resolution is relatively precise when compared to, for example control of temperature. For example, each layer of build material may comprise hundreds or even thousands of pixels which are individually addressable by a print agent applicator. However, it may be possible to have up around to four, but not more, individually controlled temperature zones across the layer. As another example, it may be the case that a single layer within an object generated in a layer wise manner comprises a single build material, although different layers may comprise different build materials.

The method then proceeds, in this example, on a parameter by parameter basis (in other examples, some or all parameters within an object generation parameter description may be considered in a combined manner). For a particular parameter mentioned in the parameter set, the determination of control data is carried out based on whether the region associated with the object generation parameter description comprises at least part of several control resolution voxels, or conversely a control resolution voxel comprises a plurality of regions associated with different object generation parameter descriptions.

If, in block 304, it is determined that, for parameter i, the object generation parameter description is associated with a region which encompasses an entire or a plurality of control resolution voxels, then the control data for each of these control resolution voxels may be determined on a probabilistic basis (block 306). In other words, for each control resolution voxel, a selection of one value for a parameter is made, based on the probabilities in the object generation parameter description. If for example an object generation parameter description comprises two values, the first having p=0.75 and the second having p=0.25, and there are 100 control voxels (or addressable regions) for a parameter within the object generation parameter description region, then around 75 of those voxels will be associated with control data for that parameter having the first value, and around 25 of those voxels will be associated with control data for that parameter having the second value. This selection may be made using halftoning techniques.

If, in block 308, it is determined that a control resolution voxel comprises at least part of plurality of different object generation parameter descriptions (or the regions associated therewith), then each of those object generation parameter descriptions, a value for parameter i is determined on a probabilistic basis, for example using halftoning techniques (block 310). These values are combined to provide control data (block 312). To consider an example, if a layer of build material is associated with 16 object generation parameter descriptions, which each consider fusing temperature, but the apparatus allows for fusing temperature variation on up to four zones across a printing bed, those four values can be selected by combining the fusing temperatures determined on a probabilistic basis from all those object generation parameter descriptions overlapping any one of the four addressable region. In some examples, the combination may be carried out on a volumetric basis, with more weight given to values from object generation parameter descriptions which occupy a larger volume of the control resolution voxel. In some examples, rather than combining the values, the object generation parameter descriptions may be combined and a new set of probabilities associated with the value sets therein. In some examples, such a combination may be made on a volumetric basis. In some examples, the control data may then be generated on a probabilistic basis.

After control data is determined for one parameter, in block 314, a new parameter (or set of parameters) is designated and the method returns to block 302.

In one example, the object generation parameter description may specify (over some volume) the volumetric probability of fusing energy and fusing spectrum as:

[Powder A, 500 w, 1100 nm: 50%; Powder B, 600 w 1200 nm: 50%]

For each addressable location within the region covered by this object generation parameter description, the control data will specify one of power A and the associated fusing settings, or Powder B and its associated fusing settings will be used, each being selected with 50% probability.

In some examples, this object generation parameter description could be represented as {Powder C; 550 w energy; and a volumetrically weighted, spectral average of the two peak spectra at 1100 and 1200 nm}, which may implicitly represent the probabilities by defining powder C as a mixture of 0.5 powder A and 0.5 powder B (albeit that, for an addressable control voxel, one powder will be selected and the other powder will not be selected).

In this example, parameters are coupled: the powders are each associated with a particular fusing temperature and spectrum. While there may be some range of spectrum/fusing energy, the ranges for different powders may be intrinsically different. In some examples, therefore, selection of one parameter value on a probabilistic basis may dictate selection of another, and/or value sets may be selected together. In such examples, the control data may be generated at the volume of the largest control voxel of the coupled parameters.

An object generation parameter description may be determined based on a mapping, for example data held in a lookup table relating a plurality object property descriptions to a plurality of object generation parameter descriptions. In some examples, there may be a mapping from object property descriptions directly to predetermined control data, the object generation parameter descriptions having been previously determined and used to generate control data. In some examples, individual properties within the descriptions may be mapped separately.

The result of the mappings to object generation parameter descriptions may be a data object indicating, for each location, the volumetric probabilities of print materials to be used (whereby print materials may refer to agents and/or build materials which may be applied at a single print-resolution location in an object to be generated) as well as their structural distribution, and also comprising a probability of at least one object generation apparatus control parameter value.

In some examples, a location may map to a plurality of object generation parameter descriptions. These may provide different options for generating control data. For example, the value set in the object generation parameter descriptions may have different probability distributions, or the parameter set may be different, and yet still result in the same or similar object properties. In such a case, a plurality of object generation parameter descriptions or mappings for that object property description may be stored as a tuple or the like. In some examples, a location may map to a plurality of object generation parameter descriptions which relate to different controllable parameters. In some such examples, it may be intended to generate control data from each of the object generation parameter descriptions (or, in some example, from at least one tuple of object generation parameter descriptions, if some of the object generation parameter descriptions have defined alternatives) for that location.

In some examples, the object generation parameter descriptions may comprise control data to control an object generation apparatus in relation to some parameters (for example, those parameters which are associated with a value which will be selected with 100% probability, either because exactly one value or value set is defined within the object generation parameter description, or because a value appears in all the value sets).

For some object representations, a subset of object property descriptions are explicitly defined (for example, the vertices of an object property volume). In a first example, interpolated object property descriptions can be determined first and then mapped to at least one object generation parameter description, for example on a voxel-by-voxel, or location-by-location, basis. In a second example, the subset of explicitly defined object property descriptions are mapped to an object generation parameter description first and further object generation parameter descriptions interpolated therefrom. In the first example, there are at least as many object property to object generation parameter description mappings as there are interpolated object property combinations, while in the second example there are fewer mappings, which may therefore make more economical use of data storage facilities.

Figure 4:
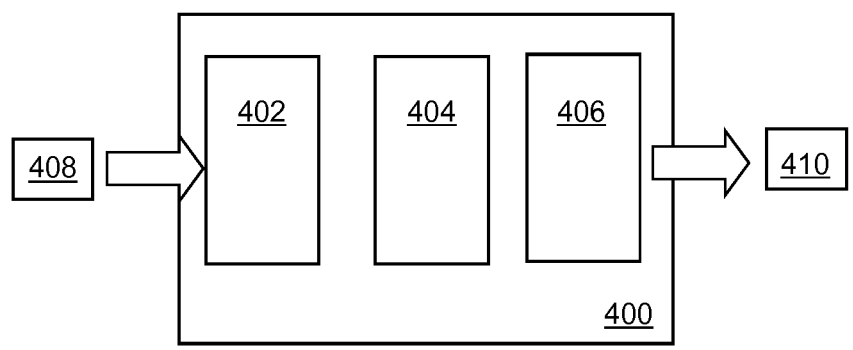
FIG. 4 is a schematic representation of an example of processing apparatus for generating control data for production of a three-dimensional object.

FIG. 4 shows an example of processing apparatus 400 that may be used to generate control data for production of a three-dimensional object. The apparatus 400 in this example comprises an interface 402, a mapping module 404 and a control data module 406.

The interface 402 receives data 408 representing a three-dimensional object. In this example, the data comprises an object property description associated with each of a plurality of object property description voxels within a geometric description of the object, where each object property description voxel comprises a region of the object having a shared object property description.

The data 408 may for example comprise object model data and object property data. The object model data may define a three-dimensional geometric model of at least a portion of the model object, including the shape and extent of all or part of an object in a three-dimensional co-ordinate system, e.g. the solid portions of the object. The object model data may be generated by a computer aided design (CAD) application. Object property data may define at least one object property for the three-dimensional object to be generated. In one example, the object property data may comprise any or any combination of a color, flexibility, elasticity, rigidity, surface roughness, porosity, inter-layer strength, density, conductivity and the like for at least a portion of the object to be generated. The object property data may define multiple object properties for a portion or portions of an object. A given object property description voxel may have associated data that indicates whether a portion of an object is present at that location. Object property data may comprise global and local object property data, e.g. certain object property values as defined in the object property data may be associated with each voxel that defines the object and/or certain object property values may be associated with a set of object property description voxels, e.g. ranging from individual object property description voxels to all object property description voxels associated with the object. In one example, the data representing the three-dimensional object comprises a model of a three-dimensional object that has at least one object property specified at every location within the model, e.g. at every [x, y, z] co-ordinate.

In some examples, the interface 402 may receive data indicative of the controllable parameters of object generation, the parameters for example comprising at least one print material distribution parameter and/or at least one object generation apparatus control parameter. A print material distribution parameter may for example comprise at least one type of build material or print agent which is available for object generation, and/or the resolution to which build materials and print agents may be applied or controlled. Object generation apparatus control parameters may comprise at least one temperature, or relate to characteristics of at least one available energy source which are controllable (such as power level, emission spectrum, etc.), a speed, or the like. In some examples, attainable values for controllable parameters may be provided. In some examples, the control resolution (for example, volumes which can be individually controlled such that a parameter has a particular value therein) may be provided.

In some examples, the controllable parameters may be associated with a particular object generation apparatus, or the apparatus in a particular state (for example, indicating if there are reserves of a particular print material). In some examples, the parameters may be associated with at least one class or type of object generation apparatus. In some examples, the parameters may be anticipated parameters, or anticipated common parameters. In some examples, the parameters may be dynamic, in the sense that the parameters may be changed or defined during an object generation operation, for example based on feedback. For example, object generation could be slowed, or fusing power increased, if it is noted that an intended fusing temperature is not being reached.

The mapping module 404 is to map the data indicative of the object property descriptions to at least one object generation parameter description. As described above, object generation parameter descriptions comprise data indicative of the probability of at least one value of one, or for each of a plurality of, controllable parameters for object generation. In this example, the parameters comprise at least one print material distribution parameter and at least one object generation apparatus control parameter. These may be described within a common object generation parameter description or in plurality of object generation parameter descriptions. In some examples, as noted above, not all object property descriptions are provided explicitly. In such examples, object property descriptions may be determined by interpolation of the explicitly held object property descriptions prior to mapping, and/or object generation parameter descriptions may be interpolated from determined object generation parameter descriptions generated for the explicitly defined object property descriptions.

The control data module 406 is to generate control data 410 from an object generation parameter description. The control data 410 may comprise an indication of at least one value for at least one controllable parameter determined according to the probabilities associated with the values for that parameters. In some examples, the control data module 406 is to determine a control resolution volume of at least one parameter and, for at least one parameter, control data 410 is determined at the control resolution of an object generation apparatus for that parameter.

In some examples, and for some data, generating control data may comprises applying halftoning to at least part of an object generation parameter description. Halftoning may for example comprise comparing a value in a print material coverage representation with a threshold values within a matrix, each threshold value representing a three-dimensional location (for example, an addressable pixel in a plane, or a voxel, or the like) to generate control data for generating a three-dimensional object based on the object. The control data 412 may for example comprise a set of discrete print material choices for a pixel in a plane, wherein the discrete values across the area of the plane may be representative of proportions set out in a print material coverage representation. The control data 412 may further comprise print apparatus control parameter values such as a fusing temperature, energy spectrum or the like.

In some examples, the control data module 406 may determine a control resolution volume of a parameter (which may be in some examples implicitly or explicitly provided for example in data indicative of the controllable parameters). If a control resolution volume of a parameter comprises a least part of a plurality of object property description voxels, the control data module 406 may determine control data for the parameter based on a combination of the object generation parameter descriptions which are at least partially within a control resolution volume. For example, a particular apparatus may not be configured so as to, for example, allow for one object property description voxel to be heated to a first temperature when another, for example neighboring, object property description voxel is heated to another as the temperature control resolution exceeds the size of an object property description voxel. In some examples, a statistical or probabilistic combination, for example an average, may be determined. This combination may be made on a volumetric basis.

In some examples, a selection (for example a user selection or an automatic selection) of a value may be made based on a value which is selected or selectable for other parameters. This selection may consider intended object properties. For example, a first set of materials may have a lower fusing energy, resulting in lower cost and/or a quicker generation process, than a second set. In this case, a selection of the higher fusing energy may be made as this selection can be used with both sets of materials. Although energy may be wasted if the first set of materials is selected in a separate selection process, this may be preferable than the lower energy being used with the second set of materials (which may for example result in a weakened object). The intersection of any set of materials and the higher energy results in the intended properties, but the intersection of any set of materials and the lower energy may not. Therefore, the lower energy may be removed from consideration if it could result in a poor result. In this example, an average energy could also result in a poor result, so this form of combining may be discounted.

Therefore, in some examples, combining the object generation parameter descriptions may comprise selection of a value, for example selection of a value which will result in intended properties no matter which other parameter values are selected.

Figure 5:
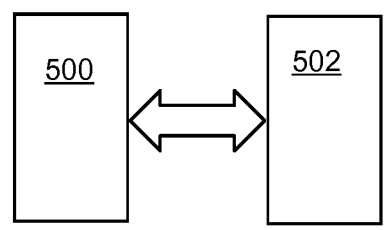
FIG. 5 is a simplified schematic of an example of processing apparatus in association with a computer readable medium.

FIG. 5 is an example of a processor 500, which may for example comprise the processing apparatus of FIG. 4, associated with a computer readable medium for storing data for access by an application program being executed by the processor 500, in this example a memory 502.

The memory 502 stores a data structure including information for use by the application program and comprising a geometrical description of a three dimensional object, for example defining a plurality of locations within the three dimensional object, and a plurality of object generation parameter descriptions. In this example, at least one object generation parameter description comprises a probability associated with at least one object apparatus control parameter value, and at least one object generation parameter description comprises a probability associated with at least one print material coverage value. In some examples, print material coverage value(s) and object apparatus control parameter value(s) may be included, with assigned probabilities, in the same object generation parameter description. The memory also holds an association between at least one object generation parameter description and a location in the geometric description of the object.

The object apparatus control parameters may comprise any or any combination of at least one of: a power level, a temperature level, an emission spectrum, choice of energy source, or the like.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 400 or the processor 500 may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of a system comprising a hardware processor, comprising:
   receiving data representing a three-dimensional (3D) object, the data comprising object property descriptions associated with respective locations of a plurality of locations within the object;
   determining, from the object property descriptions, an object generation parameter description associated with a region of the 3D object, the object generation parameter description comprising a value of an object generation apparatus control parameter and a probability that control data will specify the value of the object generation apparatus control parameter for generating the region of the 3D object, the object generation apparatus control parameter representing an operational characteristic of an operational component in an additive manufacturing system; and
   generating the control data useable by the additive manufacturing system to produce the 3D object, the control data generated based on assigning an assigned value to the object generation apparatus control parameter on a probabilistic basis according to the probability in the object generation parameter description.

2. The method of claim 1, wherein the object generation parameter description comprises a plurality of sets of object generation apparatus parameter values and probabilities associated with the plurality of sets, wherein the object generation apparatus control parameter is part of a set of the plurality of sets, and the probability that the control data will specify the value of the object generation apparatus control parameter is one of the probabilities.

3. The method of claim 1, wherein the generating of the control data comprises selecting a first value from a plurality of different values to assign to the object generation apparatus control parameter, based on probabilities associated with the plurality of different values and contained in the object generation parameter description, wherein the probability that the control data will specify the value of the object generation apparatus control parameter is one of the probabilities.

4. The method of claim 3, wherein the generating of the control data comprises:
   determining a control resolution voxel of the object generation apparatus control parameter; and
   responsive to the control resolution voxel comprising a plurality of regions associated with different object generation parameter descriptions, assigning the assigned value to the object generation apparatus control parameter according to probabilities in the different object generation parameter descriptions.

5. The method of claim 3, wherein the generating of the control data comprises:
   determining a control resolution voxel of the object generation apparatus control parameter; and
   responsive to the object generation parameter description being associated with a region comprising a plurality of control resolution voxels, assigning the assigned value to the object generation apparatus control parameter according to probabilities in object generation parameter descriptions for the plurality of control resolution voxels.

6. The method of claim 1, wherein the object generation parameter description further comprises a print material coverage value and a probability that the control data will specify the print material coverage value.

7. The method of claim 1, wherein the object generation apparatus control parameter is a control parameter of an energy source of the additive manufacturing system, and the probability is a probability that the control data will specify a value of the control parameter of the energy source.

8. An apparatus, comprising:
a processor;
an interface to receive data representing a three-dimensional (3D) object, the data comprising object property descriptions associated with respective locations of a plurality of locations within a geometric description of the 3D object; and
a non-transitory storage medium comprising instructions executable on the processor to:
determine, from the object property descriptions, object generation parameter descriptions associated with respective regions of the 3D object, the object generation parameter descriptions comprising data indicative of probabilities of values for a plurality of controllable parameters for generation of the 3D object; and
generate control data useable by an additive manufacturing system to produce the 3D object, the control data generated based on assigning values to the plurality of controllable parameters on a probabilistic basis according to the probabilities in the object generation parameter descriptions, wherein a first controllable parameter of the plurality of controllable parameters represents an operational characteristic of an operational component in the additive manufacturing system.

9. The apparatus of claim 8, wherein the instructions are executable on the processor to generate the control data by selecting a first value from a plurality of different values to assign to the first controllable parameter, based on probabilities associated with the plurality of different values and contained in an object generation parameter description of the object generation parameter descriptions.

10. The apparatus of claim 8, wherein the instructions are executable on the processor to generate the control data by applying halftoning to at least part of the object generation parameter descriptions.

11. The apparatus of claim 10, wherein for a given controllable parameter of the plurality of controllable parameters, the instructions are executable on the processor to apply the halftoning at a resolution corresponding to a control resolution volume for the given controllable parameter.

12. The apparatus of claim 8, wherein the instructions are executable on the processor to:
determine a control resolution volume of a given controllable parameter of the plurality of controllable parameters; and
responsive to the control resolution volume comprising at least part of a plurality of object property description voxels, determine control data for the given controllable parameter based on a combination of the object generation parameter descriptions that are at least partially within the control resolution volume.

13. The apparatus of claim 8, wherein the instructions are executable on the processor to determine the object generation parameter descriptions by mapping the object property descriptions to the object generation parameter descriptions.

14. A non-transitory computer readable medium storing instructions that upon execution cause a system to:
receive data representing a three-dimensional (3D) object, the data comprising object property descriptions associated with respective locations of a plurality of locations within the 3D object;
determine, from the object property descriptions, an object generation parameter description associated with a region of the 3D object, the object generation parameter description comprising plural values of an object generation apparatus control parameter and respective probabilities that control data will specify the plural values of the object generation apparatus control parameter for generating the region of the 3D object, the object generation apparatus control parameter representing an operational characteristic of an operational component in an additive manufacturing system; and
generate the control data useable by the additive manufacturing system to produce the 3D object, the control data generated based on assigning an assigned value to the object generation apparatus control parameter on a probabilistic basis according to the probabilities in the object generation parameter description, wherein the assigned value is selected according to a first probability associated with a first value of the plural values, and according to a second probability associated with a second value of the plural values, and wherein the first probability and the second probability are part of the probabilities.

15. The non-transitory computer readable medium of claim 14, wherein the object generation apparatus control parameter is a control parameter of an energy source of the additive manufacturing system, and the probabilities are probabilities that the control data will specify respective values of the control parameter of the energy source, the control parameter of the energy source comprising at least one of:
a power level, a temperature level, or an emission spectrum.

16. The apparatus of claim 8, wherein the plurality of locations comprise a plurality of object property description voxels, and the object property descriptions are associated with respective voxels of the plurality of object property description voxels, and wherein each voxel of the plurality of object property description voxels comprises a region of the 3D object having a shared object property description.

17. The apparatus of claim 8, wherein the plurality of controllable parameters comprise a print material distribution parameter that controls an amount of a print material used in producing the 3D object by the additive manufacturing system, and an object generation apparatus control parameter that controls a setting of an energy source of the additive manufacturing system in producing the 3D object.

18. The apparatus of claim 8, wherein a probability of the probabilities specifies a likelihood that a value set comprising a plurality of values for a controllable parameter will be selected in the control data.

19. The method of claim 7, wherein the control parameter of the energy source comprises at least one of a power level, a temperature level, or an emission spectrum of the energy source, and the probability is a probability that the control data will specify a value of the at least one of the power level, the temperature level, or the emission spectrum.

20. The method of claim 1, wherein the object generation apparatus control parameter is a control parameter of an agent applicator for applying an agent of the additive manufacturing system, and the probability is a probability that the control data will specify a value of the control parameter of the agent applicator.

* * * * *